United States Patent [19]

Arragon et al.

[11] Patent Number: 4,691,352

[45] Date of Patent: Sep. 1, 1987

[54] ARRANGEMENT FOR DECIPHERING AND DECODING TELEVISION PICTURES ENCODED IN ACCORDANCE WITH THE MAC STANDARD AND SCRAMBLED AT TRANSMISSION BY SUBMITTING THE VIDEO SIGNALS TO CYCLIC PERMUTATIONS

[75] Inventors: Jean-Pierre Arragon, Roissy-En-Brie; Jean-Pierre Michel, Yerres, both of France

[73] Assignee: U.S. Philips Corporation, New York, N.Y.

[21] Appl. No.: 711,545

[22] Filed: Mar. 13, 1985

[30] Foreign Application Priority Data

Mar. 16, 1984 [FR] France ................................ 84 04099

[51] Int. Cl.$^4$ ............................................. H04N 7/167
[52] U.S. Cl. ........................................ 380/14; 380/20
[58] Field of Search ................ 358/114, 119, 122, 123

[56] References Cited

U.S. PATENT DOCUMENTS

| 4,070,693 | 1/1978 | Shutterly | 358/123 |
| 4,405,942 | 9/1983 | Block et al. | 358/119 |
| 4,547,802 | 10/1985 | Fogarty et al. | 358/119 |

FOREIGN PATENT DOCUMENTS

8303942 11/1983 United Kingdom ................ 358/114

Primary Examiner—Stephen C. Buczinski
Assistant Examiner—Melissa L. Koltak
Attorney, Agent, or Firm—Thomas A. Briody; William J. Streeter; Gregory P. Gadson

[57] ABSTRACT

An arrangement for deciphering and decoding television pictures which were scrambled at transmission by submitting the video signals to cyclic permutations from the addresses $x_i$ of points of cut produced by a pseudo-random digital address generator. Said video signals being separate components such as analog components of the MAC type, the arrangement comprises for recreating the permuted signals two sets of random access memories ($Y_1$, $Y_2$) and ($C_1$, $C_2$, $C_3$, $C_4$) which are used alternately, and deciphering and decoding are realized for each component either by a first phase in which the memory is written obtained by an address jump as a function of the address of said points of cut followed by a second phase in which the memory is read sequentially, which in addition provides the time expansion of the compressed signals, or by a first phase in which the memory is written sequentially followed by a second memory read phase obtained by address jumps as a function of the address of said point of cut and which ensures in addition the time expansion of the compressed signals.

9 Claims, 13 Drawing Figures

ARRANGEMENT FOR DECIPHERING AND DECODING TELEVISION PICTURES ENCODED IN ACCORDANCE WITH THE MAC STANDARD AND SCRAMBLED AT TRANSMISSION BY SUBMITTING THE VIDEO SIGNALS TO CYCLIC PERMUTATIONS

The present invention relates to a novel deciphering and decoding arrangement for television pictures transmitted in accordance with the MAC encoding procedure and scrambled by submitting the video signals to cyclic permutations.

The MAC standard is a time division multiplexing method for analog components described in the report 116/81 UDC 621.396.946 "Direct television broadcasts by satellite: desirability of a new transmission standard" by K. Lucas and M. D. Windrow, independent Broadcasting Authority, Crawley Court, Winchester, Hants SO21-2QA and, more recently in the article "Television systems for DBS" published in the periodical "The radio and electronic engineers", Vol. 52, No. 7, July 82, page 311 etc. This standard is recommended by the UER in document SPB284 proposed for standardization and specification to the SCCIR.

The MAC method provides the sequential transmission for each scanning line of the chrominance and luminance components, an example of a MAC signal being shown in FIG. 5 of the above-mentioned report. In the MAC standard, the luminance signal Y and alternately, the chrominance signal U (which is proportional to B-Y) is transmitted in each line in the odd lines and V (proportional to R-Y) in each even line of the images. The encoding principle consists of the time-division multiplexing of the colour difference (U or V) and the luminance (Y) components. The baseband signal corresponding to these components satisfies the CCIR 625 line standard and has a duration of $51.85 \pm 0.3$ microseconds. More specifically, in the example proposed by the UER of the specification for the CCIR the encoding operation consists in offooting a time compression by a factor of 3 for the colour difference signal (denoted the chrominance signal in the sequel for the sake of simplicity and brevity) and by a factor 3/2 for the luminance signal. Decoding is effected, for example, with the aid of arrangements employing serial analog or digital memories as described in the French Patent Application field on Feb. 25th 1983 under the No. 8303112.

Figure 1A:
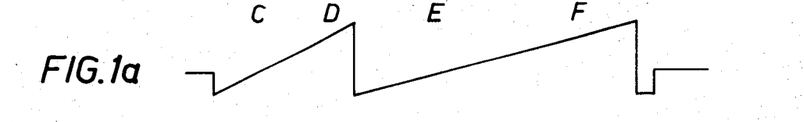
FIG. 1a shows the encoding principle for video signals in accordance with the MAC standard, providing for the time sequence of a chrominance component and a luminance component.
Figure 1B:
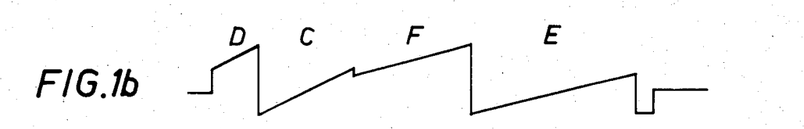
FIG. 1b illustrates the principle of the proposed scrambling in accordance with this MAC standard.

The signal is enciphered by effecting separately on each component Y, U and V an operation in which the order of points from an abscissa X, which varies at each line, is changed. An example of such an operation consists of effecting a cyclic permutation of these points from an abscissa X as described in the French Patent Application filed on Sept. 14th, 1982 under the No. 8215533 which relates to a television image enciphering method characterized, as shown in FIG. 1 of the present application, in that the analog chrominance and luminance components are each divided, one after the other, on transmission in each line, into two consecutive signals C and D on the one hand and E and F on the other hand, of which the first signal C or E is then delayed by the duration of the second signal and the second signal D or F is advanced by the duration of the first signal, the reference period preceding the chrominance component being excluded from this process, as is also the interval at the line start reserved for the transmission of data and for the digital synchronization and the positions $x_1$ and $x_2$ of the points of cut being derived from a pseudo-random digital sequence.

This procedure must also be applied in the opposite sense on reception for the simultaneous recovery of the luminance Y and the colour difference U and V signals. Actually, the subscribers which possess the deciphering key may derive the abscissa x of this key and consequently recreate the signals scrambled thus. The digital sequences which define the positions of the points of cut are obtained, for example, by using the pseudo-random digital sequence generator described in the French Patent Application filed on Aug. 22nd, 1983 under the No. 8313540 or by using the Data Encryption Unit circuit of Intel.

Moreover, the alternate transmission of the colour difference signals U and V makes the use of spatial filters at the transmission and receiving ends indispensable, so as to suppress the visual errors (subjective) resulting from this sequential transmission and which are produced by the recovery in the spatial domain of the sampled signal spectra.

Figure 2:
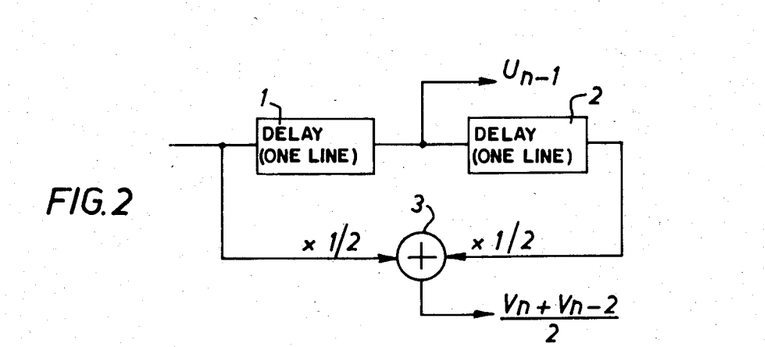
FIG. 2 shows the chrominance signal filtering circuit at the receiving side.

FIG. 2 shows the filter intended for use on the receiving side, which is composed of two delay lines 1 and 2 producing time delays equal to the duration of one line and an adder 3 receiving the input signal from the line 1 and the output signal of the line 2 after a multiplication by a factor ½ (the index n which relates to the signals U and V being the line number). Taking into account that, according to the document UER-SPB 284, this filter must be of the transversal 1, 2, 1 type, the chrominance signal U/V lags one line behind the luminance signal Y. So as to minimize the memory capacity required at the receiving end it is proposed, in the actual MAC standard project, to transmit the chrominance signal one line ahead of the luminance signal. When one single pseudo-random digital sequence generator producing the homothetic chrominance and luminance addresses of cut (ratio 2 in the duration of the compressed signals) were used, the address of the points of cut of the chrominance signal would be that of the current line, whilst the address of the point of cut of the luminance would be that of the preceding line. This deciphering operation, if it only utilizes one single pseudo-random sequence generator requires the storage of the preceding pseudo-random address.

Since, in a conventional manner, random access memories are used to effect the decoding and deciphering operations, it is necessary to multiplex the addresses of the memory cells and to produce raw address selection and column address selection signals. The reason therefor is that, from the point of view of technology and cost, the number of connecting pins of the corresponding integrated RAM circuit is limited. To realize the deciphering arrangement it is necessary to realize functions such that the multiplexing of addresses in circuits exterior of the memory cases, which are unnecessary functions since the access to the memory cell proper then necessitates the multiplexing and decoding of its addresses. Likewise, the use of several memory cases requires the presence of current amplifiers (buffers) which increase the bulk, the cost and power consumption of the deciphering and decoding arrangements.

SUMMARY OF THE INVENTION

The present invention has for its object to provide a deciphering and decoding arrangement which within the same integrated circuit combine the deciphering, decoding, memory cell addressing, storage and possibly digital-to-analog conversion functions.

To accomplish this object, the invention relates to an arrangement for deciphering and decoding television pictures which were scrambled at transmission, by submitting the video signals to cyclic permutations, from the addresses $x_i$ of points of cut produced by a pseudo-random digital address generator. The video signals are separate components such as analog components of the MAC-type. It comprises for recreating the permuted signals two sets of random memories which are used alternately, the number $n_i$ of cells of each memory being equal to the length of the useful signal on which the cyclic permutation is effected. Deciphering and decoding are realised for each component by a first phase in which the memory is written obtained by an address jump as a function of the address of said point of cut, in such a way that the enciphered signal is written in the memory in the location it would occupy if it were not enciphered. In a following second phase in which the memory is read sequentially which in addition provides the time expansion of the colour difference signals U/V or chrominance signals and of the luminance signal Y. The video signals being separate components such as analog components of the MAC type, the invention may comprise for recreating the permuted signals two sets of random-access memories which are used alternately, the number $n_i$ of cells of each memory being equal to the length of the useful signal on which the cyclic permutation is effected, and in that deciphering and decoding are realised for each component in a first phase in which the memory is written sequentially followed by a second phase in which the memory is read obtained by address jumps as a function of the address of said point of cut, in such a way that the enciphered signal is read from the memory in the location it would occupy if it were not enciphered. This phase simultaneously provides the time expansion of the colour difference signals U/V or chrominance signals, and of the luminance signals Y.

In either of these cases, combining the addressing, deciphering, decoding and storage within the same integrated circuit, permits designing a digital integrated circuit taking account of the extremely high integration densities which are at present available.

Particulars and advantages of the invention will become apparent in greater detail from the following description given by way of non-limitative example with reference to the accompanying drawings in which

DESCRIPTION OF THE FIGURES

FIG. 3 which contains the FIGS. 3a and 3b which must be considered in combination, shows an example of the deciphering and decoding arrangements according to the invention;

DESCRIPTION OF THE PREFERRED EMBODIMENT

Three important characteristics of the signal MAC must be stressed before the invention is described in greater detail:

(a) Transition periods during the duration of the chrominance and luminance components are provided so as to ensure a transient response with a minimum or ringing and such that the frequency spectrum of the FM modulated signal will be compatible with the capacity of a satellite channel (approximately 27 MHz), these transitions which correspond to the edges of the images being realised by interpolation (the specification actually proposes a transition over 3 points);

(b) in order to mitigate the inaccuracy of the phase reference of the sampling frequency on reception because of group propagation time variation from one arrangement to the other (this reference being obtained from the digital data channel), a redundancy (after enciphering) by a certain number of points 1 to n is introduced, that is to say that the same portion of the image is transmitted two times consecutively;

(c) the points necessary for this redundancy are taken in the zone constituted by the consecutive points resulting from the artificial proximity in time of the end of a picture to the beginning of the picture produced by the permutation of two line segments, an interpolation of the order of 0 then being for example provided in this zone.

Figure 3A:
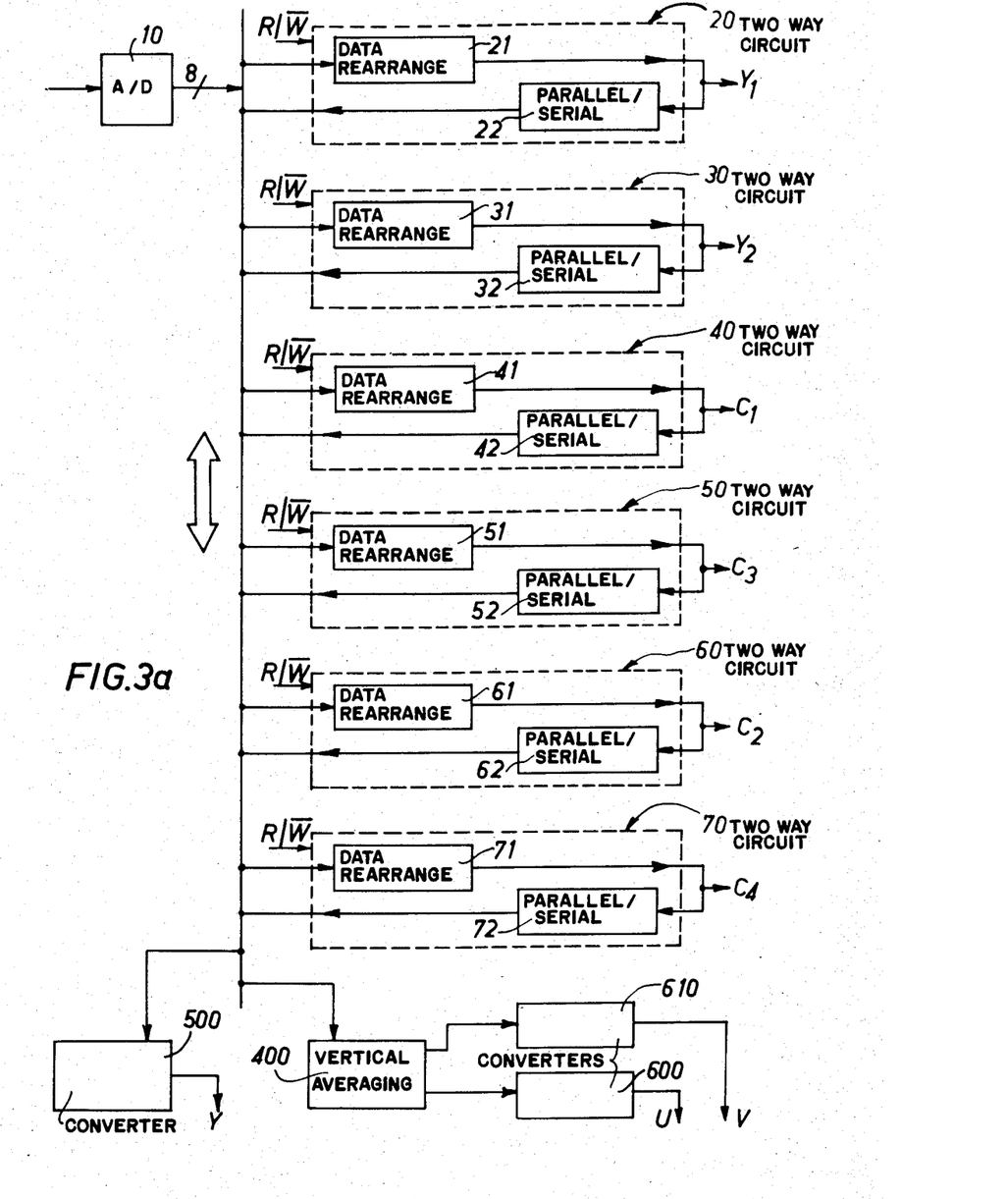
Figure 3B:
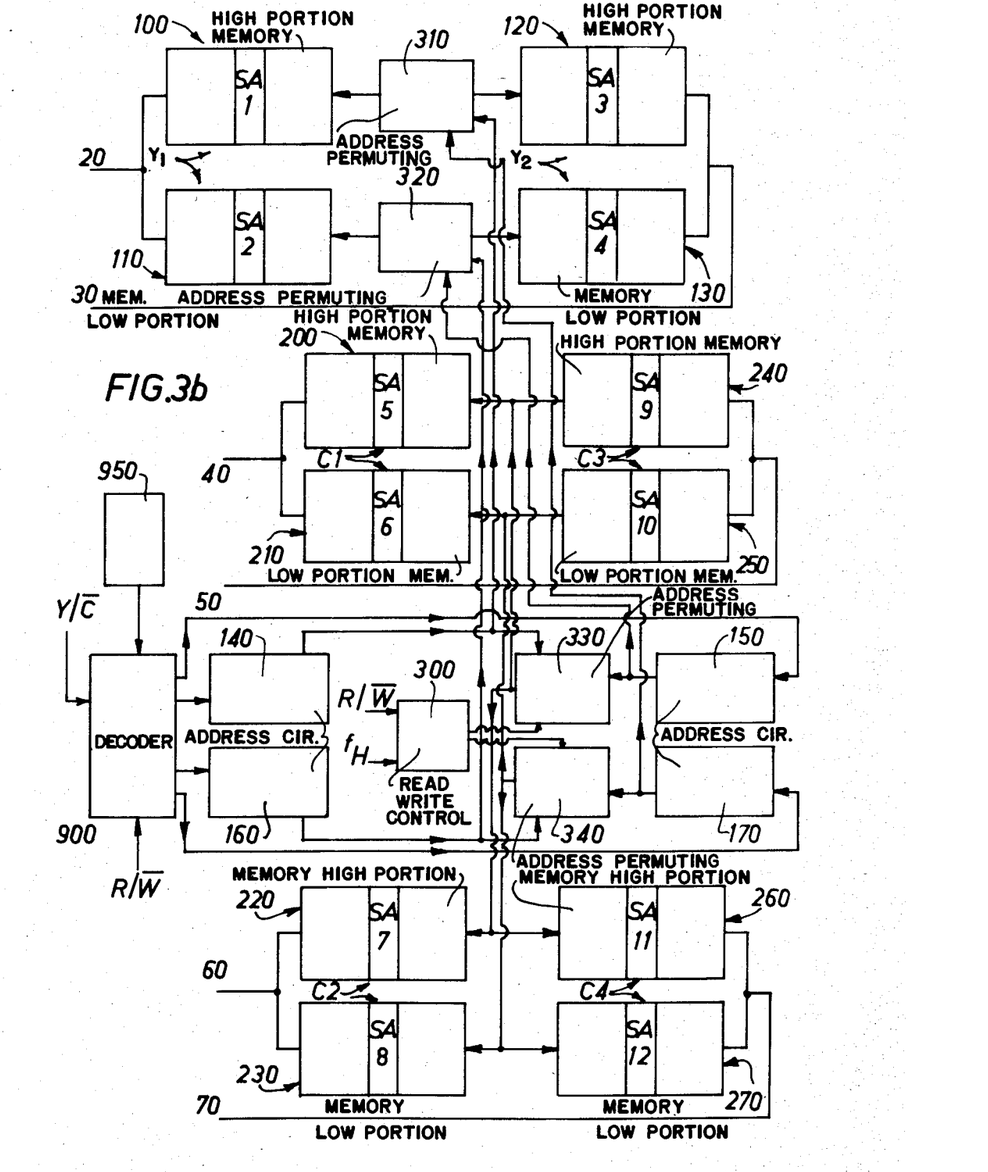
Figure 7:
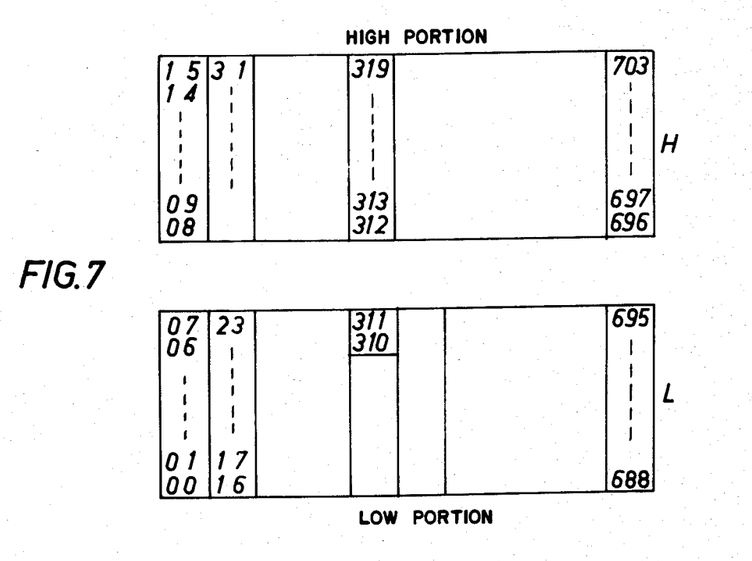
FIG. 7 illustrates the separation of the luminance or chrominance into two portions H and L or high and low, and the FIGS. 8a and 8b show the position of the bytes in the luminance signal with and without points of cut and permutation of the signal respectively.

After due consideration has been given to these three characteristics, FIG. 3 formed by the FIGS. 3a and 3b which must be considered in combination, shows an embodiment of the arrangement with the aid of which the deciphering and decoding operations are possible and which comprises the following components:

(A)(1) an input circuit constituted by an analog-to-digital converter 10 receiving the enciphered, bandwidth-limited (8.4 MHz in MAC-C) MAC signals and which here supplies for example 8 bits (the number of bits conveyed by a connection is symbolically shown in the Figures by an oblique line through this connection and bearing this number 8);

(B) for each bit originating from the converter 10 if, as described above, the converter 10 supplies, for example, 8 bits, the circuits provided in (2) to (5) in this paragraph (B) must be multiplied by 8;

(2) two two-way circuits 20 and 30 for processing the luminance components each comprising:

(a) a circuit for converting the serial information components into re-arranged bytes (21 or 31 respectively) which ensures that:

a deciphering operation during the memory-writing phase at a rate which is compatible with a moderately fast technique, approximately 1.3 MHz;

an arrangement of even and odd bytes, with a view of writing them into the low and high memories (these low and high memories will be described in detail hereinafter);

(b) a parallel-to-series converter register (22 and 32, respectively) by means of which the data resulting from reading the memory are serialized;

(3) four two-way circuits 40, 50, 60 and 70 for processing the chrominance component identical to the circuits 20 and 30;

(4) two luminance random-access memories (110, 100) and (120, 130) so-called $Y_1$ and $Y_2$ memories which alternately operate at half the line frequency during the writing operation and receiving during the luminance interval the luminance signals in 8 bits originating from the circuits 21 and 31, these memories are each formed by a high portion H (100 and 120, respectively) a low portion L (110 and 130, respectively) and read amplifiers SA1 to SA4 each high or low memory being composed from twice 22+1 columns, the last column being in a conventional way the reference column and the overall useful portion (outside reference) of one of these luminance memories therefore having $2 \times 2 \times 22 \times 8$ memory cells, that is to say 704, and each memory $Y_1$ or $Y_2$ receives furthermore 44 addressing wires for the high portion, coming either from the write/read addressing circuit 140 or from the addressing circuit 150, via an address permuting circuit 310 and 44 address wires for the low portion, coming from the same addressing circuit 160 or from the addressing circuit 170, via an address permutating circuit 320 (these circuits will be dealt with at a later instant in the present enumeration whilst an example of the high memory portion H and the low memory portion L is shown in FIG. 7).

(5) Four chrominance random access memories, denoted by C1 (200, 210), C2 (220, 230), C3 (240, 250) and C4 (260, 270) which each receive during the chrominance interval the chrominance signals in 8 bits and each constituted as described in (4) of a high portion, a low portion and read amplifiers SR5 to SR12: each high or low memory is formed from 2 times 11+1 columns, the overall useful portion of one of these chrominance memories thus having $2 \times 2 \times 11 \times 8 = 352$ points and each high or low portion of each memory receiving furthermore 22 addressing wires coming from the respective circuits 140/150 or 160/170 via address permuting circuits 330 and 340, respectively and also a read/write control signal, denoted here by R/$\overline{W}$ originating from the time base (the deciphering/decoding operation requiring, strictly speaking, only two of these memories but two additional chrominance memories are necessary because of the sequential transmission and the post-filtration of the colour difference signals, the functions of these four memories being permuted with the aid of the permuting circuit 310 and 320 in each line: actually, as will be described in the sequel the memory C1, for example, is written-in, whilst the memories C2, C3, C4 are read during the line n, thereafter, in the sequentl line, C2 is written-in whilst C3, C4, C1 are read, and so on; within the framework of this invention this procedure is preferred, which moreover simplifies the design of an addressing circuit for these memories, rather than the conventional design, in which two memories C1, C2 are successively written and read, by permuting their function, and consists of the use of two memories C3 and C4 for effecting the averaging and permuting operations;

(C) Additional circuits formed by:

(6) the four identical addressing circuits 140, 150, 160, 170 which effect the writing and reading operations of the luminance Y and the chrominance C memories; during writing the same circuit, for example 140, is used successively for writing C and thereafter the luminance memory Y, and during reading the same circuit, for example 150, performs the simultaneous reading of the memories C and Y;

(7) a selection and permuting circuit 300 for the chrominance memory which is written-in and for the three chrominance memories which are read, and the address permuting circuits 310, 320, 330, 340;

(8) a vertical averating and colour difference signal permuting device 400 which is operated at 6.75 MHz and also ensures the post-filtrating and the simultaneous recovery of the signals U and V;

(9) three digital-to-analog converters (the output may optionally be analog):

(a) a first converter 500 for the luminance information operated at 13.5 MHz and alternately receiving at half the line frequency, the content of the memory Y1 and thereafter the content of Y2;

(b) two converters 600 and 610 for the colour difference information components U and V, operated at 6.75 MHz and alternatingly receiving at half the line frequency, the contents of memories C1 and C2, for example depending on the permutation state of the chrominance memories at that instant;

(10) a decoding circuit 900 for the addresses of the points of cut which, from the information supplied by a pseudo-random sequence generator 950 supplies the column addresses of the luminance and chrominance memories Y and C and re-orders and directs the data byte to the high or low memories, in the reading phase.

As indicated in the course of this enumeration, the arrangement requires the presence of a write/read signal R/$\overline{W}$ and a signal indicating the nature of the signal at a given instant (luminance and chrominance) but these signals are produced in another device (time base) which does not form part of the invention and which is therefore not shown.

The mode of operation of an arrangement thus composed is as follows. The analog MAC signal of the filtering is converted into a digital signal by the converter 10 at a sampling frequency of 20.25 MHz, this converter producing an 8-bit word approximately every 49.4 ns. Each bit of this word will then be processed separately in accordance with the procedure described in the sequel it being understood that there are as many luminance and chrominance signals processing circuits 20 to 70 as there are bits, as was already described with reference to FIG. 3.

Figure 4:
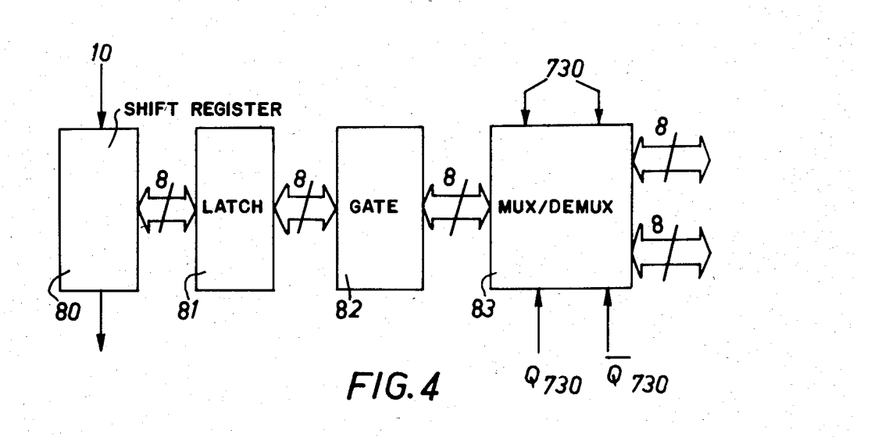
FIG. 4 shows the structure of one of the two-way circuits for processing the luminance components or the chrominance component.

FIG. 4 shows in greater detail one of the two-way circuits for processing the luminance component or the chrominance component in which the data supplied from each output of the analog-to-digital converter 10 enter serially, at a rate which is here equal to 20.25 Mb/s (these data enter the chrominance processing circuit C or the luminance processing circuit Y according as whether one or the other of these signals appears). These processing circuits perform a series-to-parallel conversion of the data so as to reduce the memory write or read rate and to establish compatability with the existing techniques, the high density integration techniques. Eight consecutive bits are converted into a byte by serializing with the aid of a shift register 80 filled by storing during eight bit durations (so-called 8 time bits) by means of the 8-bit memory 81 (latch). Each byte is stored in the random-access memory C or Y in the position it would occupy if it had not been previously enciphered, which position is a result of a sequential cutting of the line into bytes. Sequentially reading the memory then effects the time expansion (as described in the foregoing during the coding operation time compression takes place). Re-arranging the data is effected alternately for the chrominance and the luminance. The re-arrangement obtained by controlling the storing function of the memory 81 is effected from the address produced by the pseudo-random sequence generator 950. The memory 81 is followed by a gate circuit 82 which itself precedes a multiplexer-demultiplexer 83.

Figure 5:
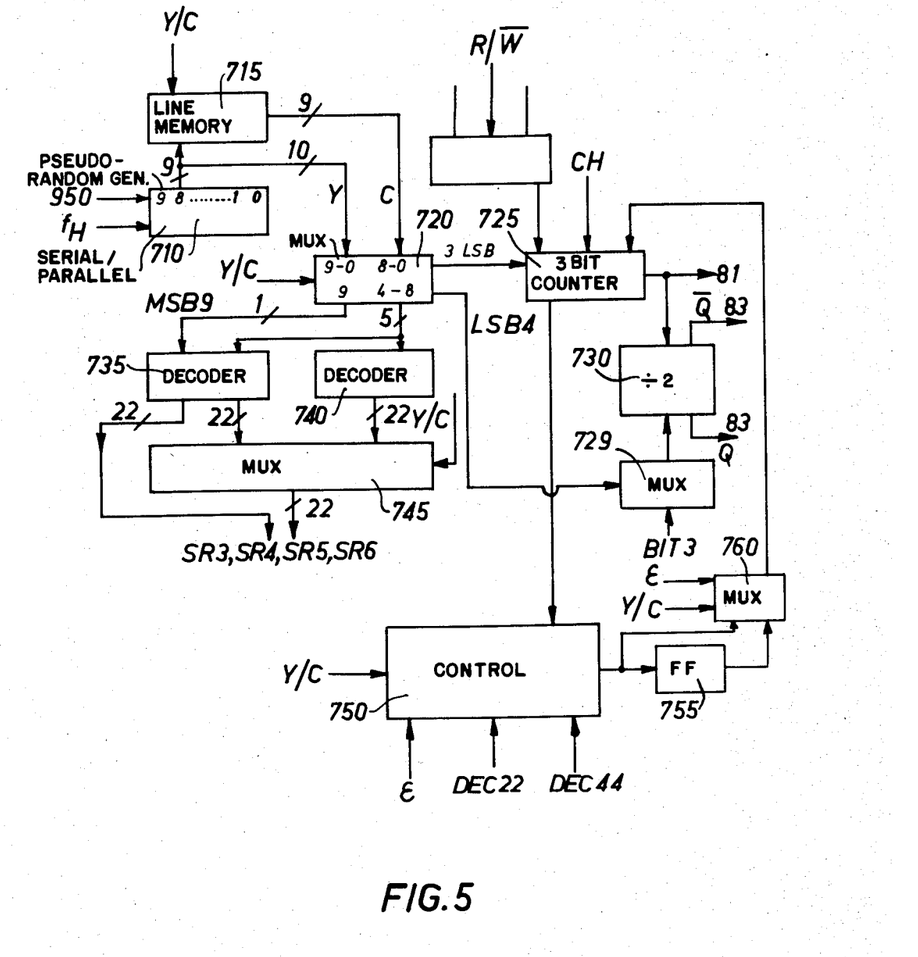
FIG. 5 shows the structure of the circuit for decoding the addresses of the points of cut.

FIG. 5 shows in detail an embodiment of the decoding circuit 900 for the addresses of the points of cut supplied by the pseudo-random sequence generator. Actually, the series output of this pseudo-random sequence generator can supply 256 addresses of points of cut per television line to be modified, it is moreover not necessary for these addresses to be located near the edges of the image (address of the chrominance point of cut: $x_c = S + 64$, address of the luminance point of cut: $x_Y = 2S + 128$ for example). The supplied address of the point of cut (in the serial form) is converted in parallel by a register 710 which is activated by the accompanying frequency $f_H$ of the data. Because of the fact that the address of the points of cut is different for the chrominance and the luminance intervals, the content of this register is stored during a line in a memory 715 and the end of the chrominance interval. The current address is utilized to re-arrange the luminance, the stored address is utilized for re-arranging the chrominance. During a chrominance interval a multiplexer 720 supplies the address of the point of cut supplied by the shift register 710, whilst during the luminance interval it supplied the address contained in the memory 715. The three least significant bits (LSB) supplied by the multiplexer 720 represent modulo-8 the remainder R (=3 LSB) of the address of the point of cut (example: if the address of the point of cut for the luminance Y is 310, the remainder modulo-8 is equal to 6 or 110 in binary notation) and load a 3-bit counter 725 which operates as a clock frequency of 20.25 MHz. When this counter reaches the counting position 111, its carry controls the transfer of the content of register 80 to the memory 81 (see FIG. 4) and energizes a divide-by-2 divider 730. The $4^{th}$ LSB (LSB 4) from the output of the multiplexer 720 resets this divider 730 to zero (if the $4^{th}$ LSB=1, the divider is reset to 1; if the $4^{th}$ LSB=0, the divider is reset to zero), by means of the multiplexer 729. The state of this divider controls the arrangement of the bytes either in the high portion (Q=1) or in the low portion (Q=0) of the RAM Y or C. To this end, the divider 730 controls the multiplexer-demultiplexer 83 (see FIG. 4), which in this case operates as a demultiplexer, to convey the bytes of an even order to the low portion of the memory and the bytes of the odd order to its high portion. This demultiplexing operation and this division into high and low portions are means to obviate the memory access time problems encountered in the techniques involves (NMOS). This solution, and this is one of the advantages of the invention makes it possible to obtain an apparent repetition rate for the memory columns or 8 bit periods, whilst a memory without such a division assumes that a passage from one column (last line) to the subsequent column (first line) is effected in less than one bit period.

During substantially the entire time of the memory write cycle, the inhibition gate circuit 82 is controlled such that it is in the transfer mode (or conducting mode). At any rate, when the last octet of the line is entered into the memory, writing a portion of the byte will be inhibited. During the write cycle the control of the direction in which the memory 81 operates is in the write direction (this direction is as follows: from the register to the inhibition circuit). Each byte will be entered into a memory column. One of the special features of the invention is that the selection of the column is effected directly without the demultiplexing of an address from an address counter. The address of this column is obtained by decoding the bits supplied by the multiplexer 720 with the aid of a decoding arrangement 735, and a multiplexer 745 supplies the 44 bits for decoding the luminance points of cut:

chrominance address,
the output of the multiplexer 720 corresponds to 9 bits (LSB) supplied by the memory 715: decoding the bits 4, 5, 6, 7, 8 furnishes the selection of the appropriate column;

luminance address;
the output of the multiplexer 720 corresponds to 10 bits obtained from the shift register 710: decoding the bits 4, 5, 6, 7, 8, 9 accomplishes the selection of the appropriate column (example: when the address of the luminance point of cut is $596 = 74 \times 8 + 4$, column 38 will be selected, the byte portion will be entered into the low portion of the memory; when the address of the chrominance point of cut is $139 = 16 \times 8 + 11$, column 9 will be selected, the byte portion will be entered into the high portion of the memory).

Figure 6:
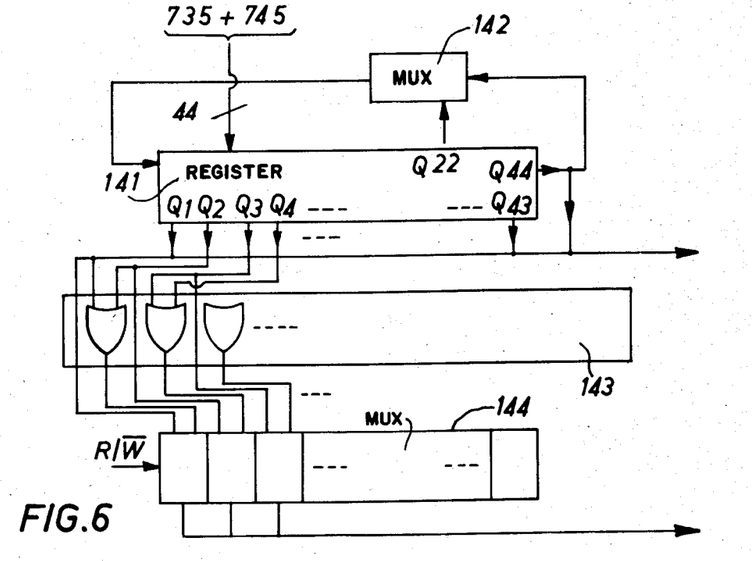
FIG. 6 shows the structure of one of the addressing circuits.

From this starting address, the address write cycle is obtained, as is indicated in FIG. 6, by means of a circular shifting operation in a shift register 141, whose output is connected to its input. In order to obtain 44 luminance addresses, the starting address is loaded in the register 141, whose $44^{th}$ output $Q_{44}$ of the register having 44 cells, is looped back to the input; to ensure that this same register operates in the "chrominance" mode (only 22 addresses), the same procedure is followed that the $22^{nd}$ output is looped to the input of the register. Forming these loops is effected with the aid of the multiplexer 142. This is illustrated by means of the following example (a = address):

$a_Y = 310 = 16 \times 19 + 6$ ⟶ col. 20 i.e. $a_{start}$: [0|0|0|···|1|0|0|0|...|0]
              col. 1     col. 20   col. 44

$a_O = 155 = 16 \times 9 + 11$ ⟶ col. 10 i.e. $a_{start}$: [0|0|0|···|1|0|0|0|·|0]
              col. 1     col. 10   col. 22

In the luminance mode, the 44 outputs of the register 141 are used to address the memory Y. Because of the fact that there are two memories Y operating in the write or read mode, each formed by two memory portions, two addressing circuits are required for each memory Y, one for the high portion the other for the low portion.

Now the mode of operation of the write-read addressing circuit will be described, first for the luminance, (the case shown in FIG. 6) thereafter for the chrominance; for each case first the write and then the read operation will be described;

(A) luminance:

(1) writing:

(a) the 44 addresses obtained by decoding the address of the point of cut a in the circuit 735 (FIG. 5) load the shift register 141 of the addressing circuit 140 and the shift register 161 of the addressing circuit 160 (it here being assumed that the pair 140, 160 is used for the writing operation but alternatively the pair 150–170 might be used to equal advantage), and the same columns are selected in the high and low portions.

(b) During loading, assuming that the byte portion is written in the even parity, the memory address of the column defined by the address a is given by the decoding circuit 735. Thereafter, (8-r) bit clock periods after the start of the luminance, the (8-r) bits of the byte are entered into the low portion. The clock of the register 141 is the output Q of the divider 730 and the clock of the register 161 is the output $\overline{Q}$ of the same divider;

(c) at the start of the second byte, the output Q of the divider 730 activates the register 141 and selects the following column a+1 whilst the second byte is being written into the same column as the first but in the high portion. At the following byte, the output $\overline{Q}$ of divider 730 energizes the register 141 whilst the third byte is entered into the address a+1 in the low portion etc.;

(d) when the last column is selected, there are several possibilities depending on the overlap value: the number of the points to be entered into the memory may, for example be 700 ($\epsilon=3$), 701 ($\epsilon=2$), 702 ($\epsilon=1$), 703 ($\epsilon=0$). As the capacity of the memory is 704 points, it is of importance to decode the number of points already entered (state of the counter 725 and of the column 44, DEC 44) and to reset the counter 725 to zero after this decoding operation, in order to enter the following bytes into the first column. This is effected by the circuit 750, the multiplexer 760 then connecting this circuit directly to the counter 725. Just before this decoding operation, the register 141 is in the state:

|0|0|0|···|1|
col. 1     col. 44 and, just after the decoding operation this register is in the state

|1|0|0|0|0|
col. 1     col. 44

(e) the procedure is continued in this way until the starting address is reached which corresponds to the end of the luminance window. The 3 least significant bits of the multiplexer 720 then prohibit writing of the memory (circuit 82 of FIG. 4).

By way of example let it be assumed that (a=address: a$_Y$=310). Just before the luminance interval column 20 is selected. The registers 141 and 161 are loaded with the content:

|0|0|···|1|0|0|···|0|
col. 1   col. 20   col. 44

Figure 8A:
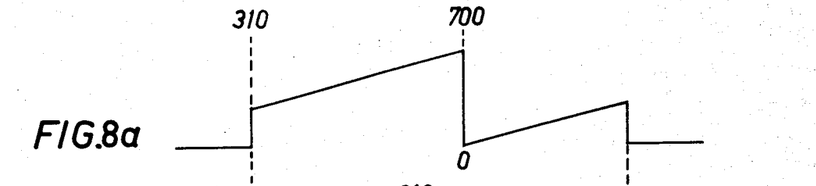
Figure 8B:
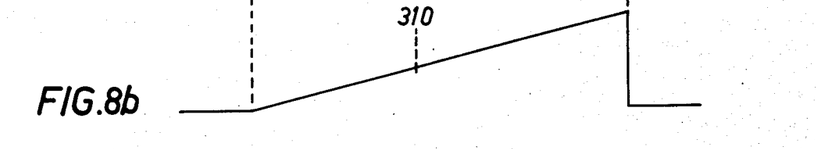

The rest has a value of 6, that is to say 110. This value is loaded into the counter 725 (input CH). Two bit periods later, this counter 725 reaches 111 and controls the storage of these two bits (2 last bits of the first bytes), resetting to zero of the divider 730 and writing these two bits into the lower portion of the memory. The clock Q of the divider energizes the register 141 which selects the following column address and 8 time periods later the subsequent byte is entered into the higher portion of the memory (see FIG. 7 which shows the high H and low L portions of the memory, the FIGS. 8a and 8b showing the position of the bytes in the luminance signal with and without the points of cut and signal permutations, respectively).

(2) reading:

(a) assuming that one wants to read memory Y$_2$ with the addressing circuits 150 and 170 an addressing circuit 150 is required for the high portion and an addressing circuit 170 for the low portion. At the beginning of the line the registers 151 and 171 are loaded with the following content:

|1|0|0|0|
col. 1   Col. 44 shift register 151 being controlled by the clock signal via the output Q of the divider 730 and shift register 171 by $\overline{Q}$. Reading is then effected in the following sequence: 1st byte, low memory, 1$^{st}$ column/selection (shifting), 2$^{nd}$ column low portion/reading; 2$^{nd}$ byte, high memory, 1$^{st}$ column/selection 2$^{nd}$ column high/read portion, 3$^{rd}$ byte, low memory, 2$^{nd}$ column/selection 3$^{rd}$ column low/read portion; 4$^{th}$ byte, high memory, 2$^{nd}$ column ... etc.

(b) the operating frequency of the counter 725 is 13.5 MHz, thus ensuring the time expansion of the luminance. The bytes originating from the random-access memories 120 and 130 are then multiplexed by the multiplexer-demultiplexer 83 conveyed by the in addition gates 82 and the memory 81 and are serialized by the parallel-two-series register 80 (rate 13.5 Mb/s).

(c) the column addresses originating from the addressing circuits 140 and 150 of the high portions (and similarly for the low portion comprising the circuits 160 and 170) are permuted at half the line frequency by the address permuting circuit 310 and 320 since this permutation is effected every alternate line, the circuit 140 (160) must address the high portion (low) of the RANDOM-access memory Y1 during the writing operation whilst the circuit 150 (170) addresses the high portion of the RAM Y2 during the reading operation and conversely during the following line (see the Tables 1a and 1b)

TABLE 1a

| Line No. | State of the line counter | Addressing circuits per memory | | | |
|---|---|---|---|---|---|
| | | C1 | C2 | C3 | C4 |
| n − 2 | 0 0 | 140/160 | | | |
| n − 1 | 0 1 | 140/160 | 150/170 | | |
| n | 1 0 | 150/170 | 150/170 | 140/160 | |
| n + 1 | 1 1 | 140/160 | 140/160 | 140/160 | 150/170 |

TABLE 1a-continued

| Line No. | State of the line counter | Addressing circuits per memory | | | |
|---|---|---|---|---|---|
| | | C1 | C2 | C3 | C4 |
| n + 2 | 0 0 | 140/160 | 150/170 | 150/170 | 150/170 |
| n + 3 | 0 1 | 140/160 | 150/170 | 140/160 | 140/160 |
| n + 4 | 1 0 | 150/170 | 150/170 | 140/160 | 150/170 |
| n + 5 | 1 1 | 140/160 | 140/160 | 140/160 | 150/170 |
| n + 6 | 0 0 | 140/160 | 150/170 | 150/170 | 150/170 |
| n + 7 | 0 1 | 140/160 | 150/170 | 140/160 | 140/160 |
| n + 8 | 1 0 | 150/170 | 150/170 | 140/160 | 150/170 |

TABLE 1b

| Line no. | Writing (E) | | | | | | Reading (L) | | | | | | Operating mode of the circuits 140 to 170 | |
|---|---|---|---|---|---|---|---|---|---|---|---|---|---|---|
| n − 1 | $U_{n-3}$ | $Y_{n-2}$ | C1 | Y1 | | | | | | | | | E | L |
| n − 1 | $V_{n-2}$ | $Y_{n-1}$ | C2 | Y2 | C1 | | | | | Y1 | | | L | E |
| n | $U_{n-1}$ | $Y_n$ | C3 | Y1 | C2 | C1 | | | | Y2 | | | E | L |
| n + 1 | $V_n$ | $Y_{n+1}$ | C4 | Y2 | C1 | C2 | C3 | Y1 | | | | | L | E |
| n + 2 | $U_{n+1}$ | $Y_{n+2}$ | C1 | Y1 | C2 | C3 | C4 | Y2 | | | | | E | L |
| n + 3 | $V_{n+2}$ | $Y_{n+3}$ | C2 | Y2 | C3 | C4 | C1 | Y1 | | | | | L | E |
| n + 4 | $U_{n+3}$ | $Y_{n+4}$ | C3 | Y1 | C4 | C1 | C2 | Y2 | | | | | E | L |
| n + 5 | $V_{n+4}$ | $Y_{n+5}$ | C4 | Y2 | C1 | C2 | C3 | Y1 | | | | | L | E |
| n + 6 | $U_{n+5}$ | $Y_{n+6}$ | C1 | Y1 | C2 | C3 | C4 | Y2 | | | | | E | L |
| n + 7 | $V_{n+6}$ | $Y_{n+7}$ | C2 | Y2 | C3 | C4 | C1 | Y1 | | | | | L | E |
| n + 8 | $U_{n+7}$ | $Y_{n+8}$ | C3 | Y1 | C4 | C1 | C2 | Y2 | | | | | E | L |

(B) chrominance: three principles are used according to the invention: (i) the addressing circuits described in the foregoing are also used for addressing the chrominance in the writing mode and are of a different configuration compared with those of the luminance mode, (it is possible as the luminance and chrominance signals are time-division multiplexed); (ii) in the reading mode, the same addressing circuit is used for both luminance and chrominance; (iii) the rules of the chrominance memories are interchanged;

(1) writing:

(a) in the writing mode, the mode of operation is the same as in the foregoing in the reading mode, with this exception that the number of memory columns is 22 instead of 44, the $22^{nd}$ output of the register 141 or 161 are connected to the input, under the control of the multiplexer 142. The 22 first outputs are supplied by the multiplexer 144, the control R/$\overline{W}$ being in the write mode (see FIG. 6).

(b) the registers 141 and 161 are loaded, starting from decoding the address of the point of cut by the arrangement 740 using the bits 8, 7, 6, 5, 4 originating from the memory 715 and which thus supplies 22 address lines. The multiplexer 745 supplies the 22 chrominance column addresses to these registers. The remaining part of the operations are identical to those required for writing the luminance. However, since the number of memory points is not more than 352, there are several possibilities according to the useful number of points of the line portion: 350 ($\epsilon=3$), 351 ($\epsilon=2$), 352 ($\epsilon=1$), 353 ($\epsilon=0$). For the first three cases the procedure is the same as for the luminance. In the last case only the $353^{rd}$ point is entered (corresponding to the end of the image): 352 is decoded (column 22) DEC 22+state of the counter 725), this decoded state is delayed using a flip-flop D (755), the multiplexer 760 controlled by the value of $\epsilon$ allowing the signal originating from this flip-flop 755 to pass, and the counter 725 is reset to zero (consequently, the $353^{rd}$ point is lost), triggering of this counter being authorized by the circuit 750 which enables the correct writing operation into the high and low portions of the memories from the overlap signal $\epsilon$, the signals DEC22 and DEC44 (which denote that the column 22 of the chrominance memory is written and the column 44 of the luminance memories) and the signal Y/C.

(2) reading: with the aid of an logic OR-circuit 143 (see FIG. 6) consecutive bits are added together, for example 1-2, 3-4, 5-6, ... 21-22, 23-24, ... 43-44. This is a characteristic of the invention, by means of which it is possible to obtain the ratio 2 in the luminance-chrominance read rates: during two luminance bit periods the same chrominance column is read. Thus, the luminance is read sequentially simultaneously with reading the chrominance.

As described in the foregoing, according to one of the characteristics of the invention, a permutation of the write/read role of the chrominance memories is effected with the object of simplifying the addressing. This permutation is illustrated in Table 1. The two right hand columns of Table 1b indicate whether the circuits 140/160 or 150/170 are in the write or the read mode. The second left-hand column of Table 1a indicates which register effects the addressing of each memory. This indication is obtained from the decoding operation of the state of a line counter incorporated in the selector 300 and used by the address permuting circuit 330 and 340 which control the high and low portions respectively of the memories C1, C2, C3, C4.

If this procedure is adopted, which is a specific advantage of the invention, it is possible, for example, to write and read alternately the memories C1 and C2 and to use the memories C3 and C4 as delayed circuits for effecting the post-filtering operation. It is then necessary to have specific addressing circuits for these last two memories, thus increasing the bulk and dimensions of the circuit.

Figure 9A:
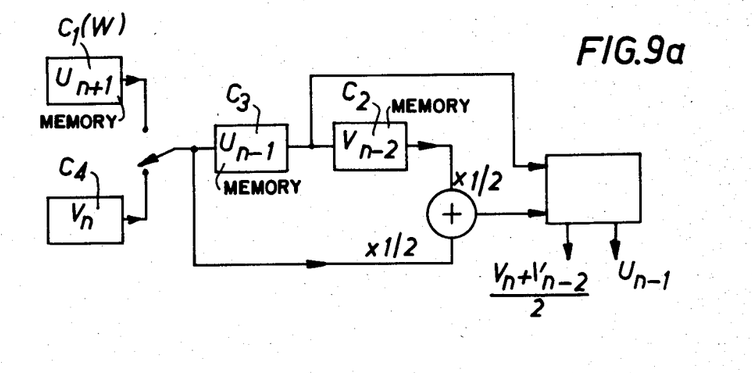
FIGS. 9a and 9b illustrate for two consecutive lines the post-filtering and recovering function of the components U and V realised by the vertical averaging and permuting arrangement.
Figure 9B:
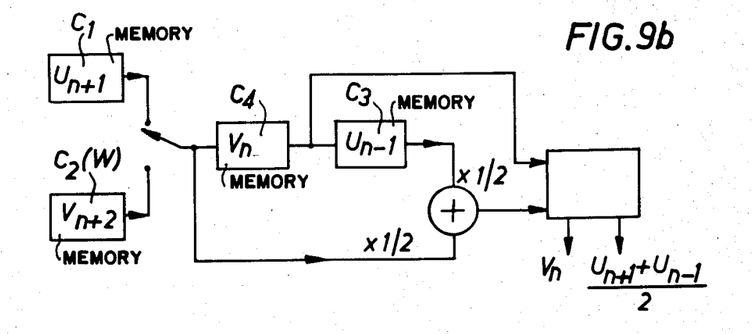

Finally, there now follows the description of the post-filtering and recovery of the U and V components. This functoion realised by the arrangement 400 for the vertical averaging and permuting of the column difference signals is shown in FIGS. 9a and 9b and is in accordance with the notation of Table 1. The averaging function is realised in each line but relates to either U or V, that is to say that instead of repeating, as in SECAM, the signal U or V of the preceding line for the missing signal U or V, the missing line is interpolated in every alternate line from the consecutive lines. Thus, by way of example, the following cycle for U and V is obtained:

$$\text{line } n + 2 \ U_{n-1}, \frac{V_n + V_{n-2}}{2}$$

$$\text{line } n + 3 \ \frac{U_{n-1} + U_{n+1}}{2}, V_n$$

$$\text{line } n + 4 \ U_{n+1}, \frac{V_n + V_{n+2}}{2}$$

$$\text{line } n + 5 \ \frac{U_{n+1} + U_{n+3}}{2}, V_{n+2}$$

FIGS. 9a and 9b clearly show, for each chrominance memory, the function provided, the relevant signal and also the number of the corresponding line, FIG. 9a corresponding, for example, to line n+2 and FIG. 9b to line n+3, the memory which is in the write mode being denoted by the latter W between brackets, the other memories then being in the read mode.

What is claimed is:

1. A digital circuit for decoding television picture signals comprising separate components of the MAC type which are scrambled with cyclic permutations, said scrambled signal being descrambled from addresses $X_1$ of points of cut produced by a pseudo-random address generator comprising:

two two-way circuits receiving from an analog to digital converter said scrambled signal in serial digital form for processing the luminance component and four two-way circuits for processing the chrominance component, each comprising:

a circuit for converting the serial digital signal information in two rearranged bytes, whereby a writing speed for memories which are to receive said serial digital signal is accommodated such that the access rate of the memory columns are equal to the sampling frequency $F_s$ of the analog to digital converter divided by the length of two digital words 2L, said bytes comprising even and odd bytes suitable for writing in separate low and high portions of a respective memory;

two sets of memories which are alternately read and written with said serial digital signal data, each memory having n1 cells equal to the length of the useful signal on which said cyclic permutations are effected, comprising:

first and second luminance memories $Y_1$ and $Y_2$ receiving during the luminance interval the digital luminance signals from said converter circuit, and four chrominance memories $C_1$, $C_2$, $C_3$ and $C_4$ for receiving during the chrominance interval digital chrominance signals from said converter circuit, each of said memories having a high portion and a low portion and an associated read amplifier, a read/write circuit for writing and reading data to and from said memories, including a permutating circuit connecting a high portion to a low portion address circuit, whereby alternately received even and odd bytes are written into high and low portions of each memory; and a parallel to series conversion register for serially rearranging data read from a memory; and, a circuit for decoding the address of the points of cut of the MAC type signal from information supplied by a pseudo-random sequence generator which supplies column addresses of the memories $Y_1$, $Y_2$, $C_1$, $C_2$, $C_3$ and $C_4$ and which directs during a write phase of said memories data bytes to said memories.

2. An arrangement as claimed in claim 1, wherein comprises a selection and permuting circuit for the chrominance memories in which writing is effected and chrominance memories which are read.

3. An arrangement as claimed in one of the claims 1 and 2, in the form of an integrated circuit comprising:
(a) a first converter for converting the luminance information, energized at the frequency $F_{S/k}$ where $F_S$ is the sampling frequency of the video signal and k the luminance compression factor, alternately receiving at half the line frequency the content of the first luminance memory Y1 and thereafter the content of the second luminance memory Y2;
(b) two converters for the colour difference information components U and V energized at $F_{S/1}$ where 1 is the chrominance compression factor, and each receiving alternately at half the line frequency the content of one of the chrominance memories.

4. An arrangement as claimed in claim 3, wherein the high or low portion of each luminance memory is constituted by (2n+1) columns, the last column being a reference column, N being such that 2NL wherein L is the word length is equal to or higher than the number of the luminance points, and each high or low portion of the luminance memories receiving 2N addressing wires, and the high or low portion of each chrominance memory is constituted by (2N'=1) columns, N' being such that 2N'L is equal to or immediately higher than the number of chrominance points, and each high or low portion of these chrominance memories receiving 2N' addressing wires.

5. An arrangement as claimed in claim 4, wherein in the four memories for the chrominance component, one is written-in whilst the three others are being read, the respective read and write roles of each of these memories being cyclically permuted from line to line, the write repetition rate in the same chrominance memory being 4 lines.

6. An arrangement as claimed in one of claim 1, wherein the same addressing circuit is used (a) for sequentially deciphering during the writing operation the chrominance signal and thereafter the luminance signal and (b) for the decoding operation realised by simultaneously reading (i) at a rate of $F_{S/k}$ the memories containing the luminance signal, and (ii) at a rate $F_{S/1}$ the memories containing the chrominance signal, $F_S$ being the sampling rate of the encoded signal, k being the luminance signal compression factor and 1 being the chrominance signal compression ratio.

7. An arrangement as claimed in claim 6, wherein the addressing circuits for the chrominance and luminance memories comprise a circulating shift register which directly addresses the memory column.

8. An arrangement as claimed in claim 6, wherein the addressing circuits for the chrominance and luminance memories comprise a counter which is associated with a decoding circuit which directly effects the addressing of the memory column.

9. An arrangement as claimed in one of the claim 2 wherein each memory used for deciphering the chrominance and luminance signals is divided into a high portion and into a low portion, such that the rate at which the high portion or the low portion of the two successive memory columns, or vice versa are accessed, is equal to $F_{S/L}$, the selection of each column N+1 of the low portion and conversely, corresponding to each access to the memory column N of the high portion in accordance with a quincuncial addressing.

* * * * *

UNITED STATES PATENT AND TRADEMARK OFFICE
CERTIFICATE OF CORRECTION

PATENT NO. : 4,691,352
DATED : September 1. 1987
INVENTOR(S) : Jean-Pierre Arragon. et al It is certified that error appears in the above-identified patent and that said Letters Patent is hereby corrected as shown below:

<u>IN THE CLAIMS</u>

Claim 2 , line 1    delete "wherein" insert --which--

Signed and Sealed this

Twentieth Day of December, 1988

*Attest:*

DONALD J. QUIGG

*Attesting Officer*    *Commissioner of Patents and Trademarks*